Sheet 1 2 Sheets.

Sheets, Dubois & Pressey.
Mower.

Nº 28782.  Patented Jun. 19, 1860.

Witnesses:
J. M. Duncan
W. A. Short

Inventors:
S. Y. Dubois
J. B. Pressey
Daniel Sheets

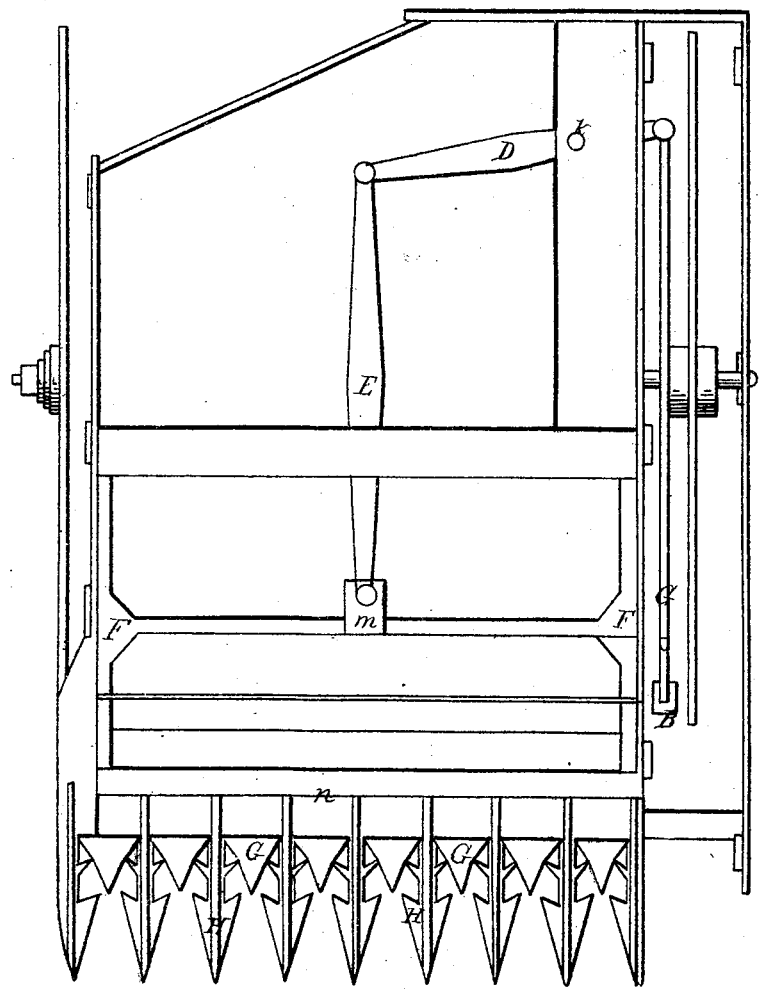

UNITED STATES PATENT OFFICE.

DANIEL SHEETS, SAMUEL H. DUBOIS, AND JOHN B. PRESSEY, OF SUISUN CITY, CALIFORNIA.

IMPROVEMENT IN MACHINES FOR REAPING AND MOWING.

Specification forming part of Letters Patent No. 28,782, dated June 19, 1860.

*To all whom it may concern:*

Be it known that we, DANIEL SHEETS, SAMUEL H. DUBOIS, and JOHN B. PRESSEY, of Suisun City, in the county of Solano and State of California, have invented a new and useful Improvement in Reaping and Mowing Machines; and we do hereby declare that the following is a full, clear, and exact description of the same, reference being had to the accompanying drawings, forming a part of this specification, in which—

Figure 3:
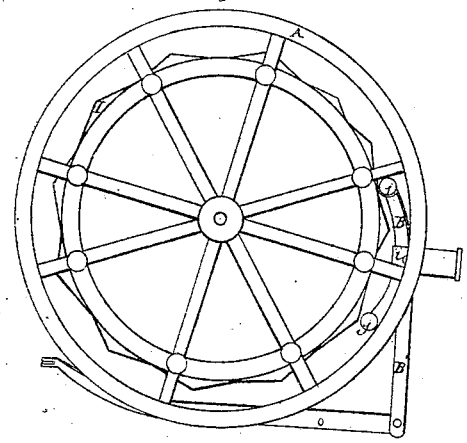
Figure 1:
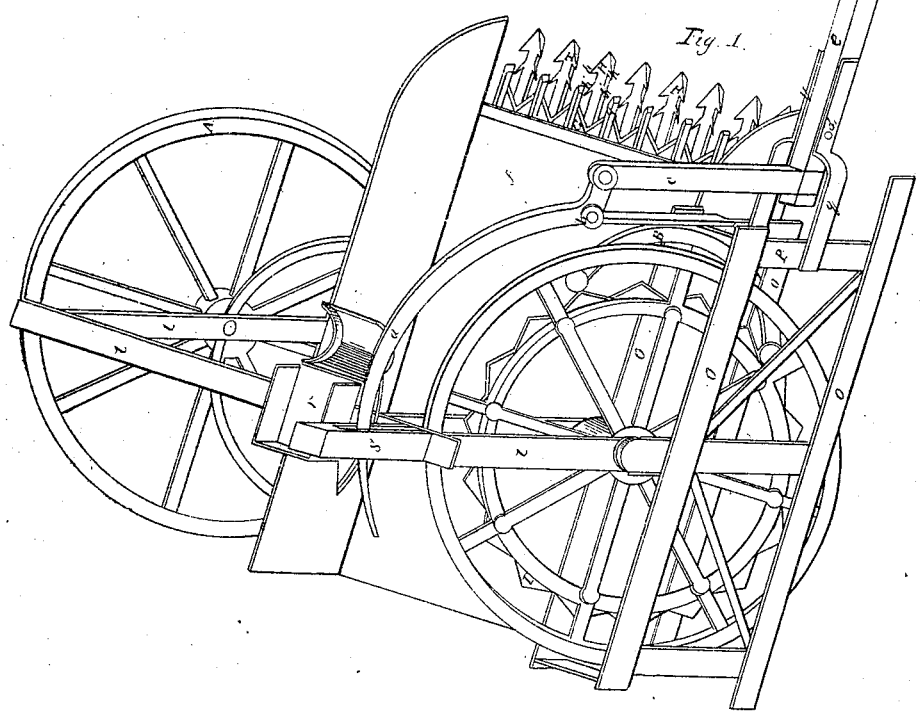

Figure 1 represents a perspective view of the reaping and mowing machine; Fig. 2, a bottom view of it, and Fig. 3 a side view of the cam-wheel.

Similar letters of reference in each of the several figures indicate corresponding parts.

The nature of our invention consists in the combination of the forward-and-backward reciprocating cutter, with the stationary spear-shaped fingers or cutters constructed, arranged, and operating together in the manner and for the purpose hereinafter specified.

To enable others skilled in the art to make and use our invention, we will proceed to describe its construction and operation.

The platform $f$ of this reaping and mowing machine is attached to a frame, $l\ o\ p$, which frame serves also for supporting the axles of the two wheels A A', one on each side of the platform.

The tongue $e$ is arranged in line with one of the two wheels, A, and is fulcrumed at $d$ by means of a pin passing through the tongue and through a pair of brackets, $q\ q$, extending from the frame $o\ p$ in front of wheel A. The short end of the tongue, behind the fulcrum-pin $d$, is linked to the short arm of a lever, $a$, by means of a connecting-rod, $c$. The fulcrum of said lever is at $b$. The upper end of the lever $a$ passes through a slot in the part $s$ of the frame of the machine, near the driver's seat $r$. The driver can set the lever higher or lower in said slot, thereby raising or lowering the front end of the tongue $e$ for the purpose of adjusting the cutting apparatus in front of the platform to the proper height above the ground.

The cutting apparatus consists of stationary fingers or cutters H, spear-shaped, as seen at $h\ h$ Fig. 1. These fingers H are fastened to the under side of the platform, somewhat in rear of its front edge. The top surface of these fingers is perfectly smooth and a zigzag-shaped cutter, G, rests upon said top surface of the fingers H. Each of the points of the cutter G is provided with a divider, $g$, and the cutter G is so formed that each point and divider will be at equal distances from the two next fingers H. The zigzag edges of the cutter $g$ G, as well as the inside edges of the wings $h\ h'$ of the spear-shaped fingers H, are sharpened. The cutters are attached to a frame, F $n$, which receives a forward-and-backward reciprocating motion, in a manner hereinafter to be described.

As the cutters move forward the grass or grain is pressed sidewise against the side edges of the fingers H by the dividers $g$, and is cut by the action of the sharp edges of cutter G against the sharp edges of the wings and sides of the fingers H.

The frame F $n$ is arranged underneath the platform $f$, and is hung to one arm of a lever, D, by means of a connecting-rod, E. The lever is fulcrumed at $k$, and its other arm is connected to the lower end of a lever, B B', by means of a connecting-rod, C. The lever B B' is pivoted to the frame of the machine at $i$, and its curved part B is provided with two friction-rollers, $j\ j$, one at each side and at some distance from the fulcrum $i$. These friction-rollers rest against the undulating surface of a cam, I, fastened to the spokes of the wheel A. As the wheel revolves the friction-rollers are alternately raised and lowered by the action of the undulating surface of cam I against them, and thus the lower end, B', of the lever B B' receives a reciprocating motion, which is transmitted to the frame F $n$ and cutter G by means of the leverage C D E, above described.

What we claim as our invention, and desire to secure by Letters Patent, is—

The combination of the forward and backward reciprocating cutter with the stationary spear-shaped fingers or cutters, constructed, arranged, and operating together in the manner and for the purpose set forth.

DANIEL SHEETS.
    SAMUEL H. DUBOIS.
    JOHN B. PRESSEY.

Witnesses:
 J. G. LAWTON, Jr.,
 JOHN I. PEKO.